United States Patent
Tsirkin et al.

(10) Patent No.: US 12,461,771 B2
(45) Date of Patent: *Nov. 4, 2025

(54) HYPERCALL ACCELERATION FOR NESTED VIRTUAL MACHINES

(71) Applicant: RED HAT, INC., Raleigh, NC (US)

(72) Inventors: Michael Tsirkin, Yokneam Illit (IL); Karen Noel, Pembroke, NH (US)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/331,514

(22) Filed: Jun. 8, 2023

(65) Prior Publication Data

US 2023/0315508 A1 Oct. 5, 2023

Related U.S. Application Data

(63) Continuation of application No. 16/866,510, filed on May 4, 2020, now Pat. No. 11,698,806.

(51) Int. Cl.
*G06F 9/455* (2018.01)
(52) U.S. Cl.
CPC ............ *G06F 9/45558* (2013.01); *G06F 2009/45583* (2013.01)
(58) Field of Classification Search
None
See application file for complete search history.

(56) References Cited

U.S. PATENT DOCUMENTS

| 2005/0240700 | A1 | 10/2005 | Bennett | |
|---|---|---|---|---|
| 2009/0007112 | A1 | 1/2009 | Moriki | |
| 2011/0047544 | A1* | 2/2011 | Yehuda | G06F 9/4555 718/1 |
| 2012/0216187 | A1* | 8/2012 | Ben-Yehuda | G06F 9/45558 718/1 |
| 2014/0053272 | A1* | 2/2014 | Lukacs | G06F 21/53 718/1 |
| 2014/0229943 | A1* | 8/2014 | Tian | G06F 9/45533 718/1 |

(Continued)

OTHER PUBLICATIONS

Lluís Vilanova, "Using SMT to Accelerate Nested Virtualization", ACM ISBN 978-1-4503-6669-4/19/06 (Year: 2019).*

(Continued)

*Primary Examiner* — Wynuel S Aquino
(74) *Attorney, Agent, or Firm* — Dority & Manning, P.A.

(57) ABSTRACT

Systems and methods for accelerating hypercalls for nested virtual machines. An example method comprises: executing, by a host computer system, a Level 0 hypervisor managing a Level 1 virtual machine (VM); receiving, by a Level 1 hypervisor managing a Level 2 VM, a first function component from a Level 2 hypervisor managing a Level 3 VM, wherein the first function component performs a first functionality associated with a hypercall issued by the Level 3 VM; generating, by the Level 1 hypervisor, a second function component that performs a second functionality associated with the hypercall issued by the Level 2 VM; and responsive to detecting the hypercall issued by the Level 3 VM, causing the Level 0 hypervisor to execute at least one of: the first function component or the second function component.

17 Claims, 7 Drawing Sheets

(56) References Cited

U.S. PATENT DOCUMENTS

2016/0085568 A1\* 3/2016 Dupre .................. G06F 9/4812
                                                        718/1
2017/0004002 A1\* 1/2017 Nakamura .......... G06F 9/45558
2017/0262306 A1\* 9/2017 Wang .................... G06F 9/5027

OTHER PUBLICATIONS

"Analyzing KVM Hypercalls with eBPF Tracing", https://suchakra.wordpress.com/2017/03/31/analyzing-kvm-hypercalls-with--ebpf-tracing/, 2017, 5 pgs.

Zhenhao Pan et al., "NestCloud: Towards Practical Nested Virtualization", 2011 International Conference on Cloud and Service Computing, 2011, pp. 321-329.

Nadav Amit, "The Design and Implementation of Hyperupcalls", USENIX Association, 2018 USENIX Annual Technical Conference, 2018, pp. 97-111.

\* cited by examiner

HYPERCALL ACCELERATION FOR NESTED VIRTUAL MACHINES

RELATED APPLICATIONS

This application is a continuation of U.S. patent application Ser. No. 16/866,510 filed on May 4, 2020, the entire content of which is incorporated by reference herein.

TECHNICAL FIELD

The present disclosure is generally related to computer systems, and more particularly, to hypercall acceleration for virtual machines in virtualized computer systems.

BACKGROUND

A virtual machine (VM) is an emulation of a computer system. When executed on appropriate hardware, a VM creates an environment allowing the virtualization of an actual physical computer system (e.g., a server, a mainframe computer, etc.). The actual physical computer system is typically referred to as a "host machine." Typically, a component on the host machine known as a "hypervisor" (or a "virtual machine monitor") manages the execution of one or more virtual machines or "guests", providing a variety of functions such as virtualizing and allocating resources, context switching among virtual machines, etc. The operating system (OS) of the virtual machine is typically referred to as the "guest operating system" or "guest OS." In some implementations, the guest OS and applications executing within the guest OS can be collectively referred to as the "guest."

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Figure 1:
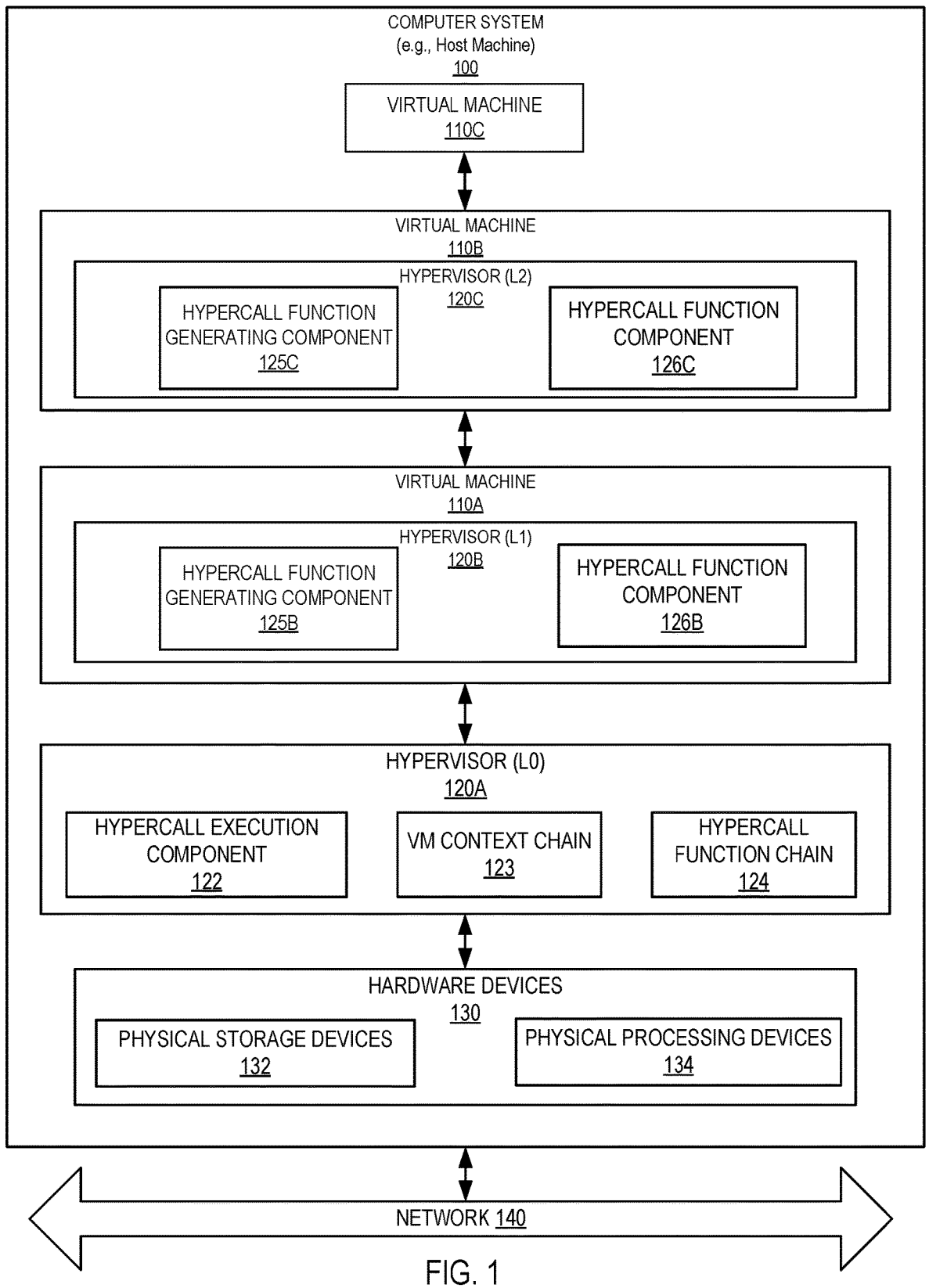
FIG. 1 depicts a high-level component diagram of an example host computer system architecture that performs hypercall acceleration for virtual machines, in accordance with one or more aspects of the present disclosure.

Described herein are methods and systems for hypercall acceleration for virtual machines in virtualized computer systems. Nested virtualization refers to virtualization that runs inside an already virtualized environment (e.g., running a hypervisor inside of a VM, which itself runs on a hypervisor). In nested virtualization, a first hypervisor (hereafter "Level 0 hypervisor" or "level 0 hypervisor") controls physical hardware resources (e.g., bare metal). One or more second hypervisors (hereafter "Level 1 hypervisor" or "level 1 hypervisor" or "L1 hypervisor") may run as virtual machine(s) managed by the Level 0 hypervisor. Each Level 1 hypervisor may run its own set of VMs. These VMs can be referred to as Level 2 VMs. Each level indicates a ring of privilege and access to computing resources of a computer system, where Level 0 indicates a most privileged ring within an architecture of the computer system, and incremental levels indicate less privileged rings (e.g., Level 2 is less privileged that Level 1). The Level 1 hypervisor may control execution of the Level 2 guest VM(s).

For example, the Level 1 hypervisor may implement a firewall in software and prevent the Level 2 guest VM from communicating outside the Level 1 hypervisor. Additionally, nested virtualization can be utilized by cloud computing providers to provide virtual machines to different clients/users. In this latter case, the cloud computing provider can run its own hypervisor to provide security/separation from any client/user, providing a VM to a client/user. The client/user can then execute an untrusted payload for testing purposes within a second nested VM (a VM that executes within the client/user's assigned VM), which would involve the client/user executing their own hypervisor to manage the second nested VM.

In conventional nested virtualized environments, the hardware level typically supports a single level of virtualization. In such systems, a nested VM that attempts to perform a privileged operation can cause an exit to the host hypervisor (e.g., the Level 0 hypervisor). In many instances, this type of exit can be caused by the VM issuing a hypercall. A hypercall is a software trap from a VM to the hypervisor that can be used by a VM to request privileged operations such as updating memory page tables, performing networking operations, or the like. In virtualized environments that are not nested, a hypercall exits to the hypervisor, which performs the privileged operation, and subsequently returns control to the VM. In nested virtualized environments, this process can involve significantly more context switches between the different nested levels depending on the level of the VM issuing the hypercall.

For example, when a Level 2 VM issues a hypercall, it exits to the L0 hypervisor. The L0 hypervisor then determines what operation to perform based on the level of the issuing VM (e.g., Level 2). The L0 hypervisor then passes control to the hypervisor that manages the Level 2 VM (e.g., the Level 1 hypervisor) to perform the appropriate privileged operation to modify the Level 2 VM context (e.g., the state of the virtual CPU for the VM, the register set, etc.). Upon completion of the operation, the Level 1 hypervisor returns control to the Level 0 hypervisor, which in turn returns control to the Level 2 VM. These additional switches between levels of a nested environment generate additional exits, which significantly increases processing cycle costs to complete a single hypercall. This, in turn, decreases system efficiency and throughput.

Some conventional implementations address this problem by implementing functionality within each level of the nested environment to perform the expected privileged operations. This, however, would significantly increase complexity since it binds each level with the level above it, which could involve implementing all hypercalls for a VM within a supporting hypervisor. Other implementations address this problem by implementing shared memory for communication between nested levels. This, however, significantly increases system resource costs for the environment since it involves increases in both memory and CPU cycles for the environment.

Aspects of the present disclosure address the above noted and other deficiencies by implementing technology to facilitate hypercall acceleration for virtual machines in virtualized computer systems. In particular, a hypercall execution component of a Level 0 hypervisor can receive an executable function component (e.g., a set of executable instructions) from each nested hypervisor within the environment and construct a chain of functions that can be executed when a hypercall is issued by a nested VM. Each executable function component can be stored by the Level 0 hypervisor and associated with the guest visible portion of the corresponding VM context for the applicable level of the nested environment. In various implementations, each nested hypervisor can implement a hypercall function generating component that can generate an executable function to be provided to the Level 0 hypervisor for the chain of functions.

Aspects of the present disclosure present advantages over conventional solutions to the issues noted above. First, implementing the hypercall function generating component at each nested level can eliminate the need to tightly couple nested hypervisors together to support hypercall functionality. This, in turn, can significantly reduce the complexity of a nested environment since hardcoded hypercall logic would not be needed at each level that is dependent upon the associated nested VM. Additionally, chaining the hypercall functions together at the Level 0 hypervisor can significantly reduce the overhead involved in hypercalls issued by nested VMs since the overhead involved in excessive exits can be reduced. The Level 0 hypervisor can execute the functions within the chain to provide the hypercall functionality without performing multiple context switches per hypercall. Moreover, security of the overall process can be significantly improved since each hypercall function is tied to the guest visible portion of its corresponding VM context.

FIG. 1 is a block diagram of a host computer system 100 in which implementations of the disclosure may operate. Although implementations of the disclosure are described in accordance with a certain type of system, this should not be considered as limiting the scope or usefulness of the features of the disclosure.

As shown in FIG. 1, computer system 100 may be a single host machine or multiple host machines arranged in a cluster and may include a rackmount server, a workstation, a desktop computer, a notebook computer, a tablet computer, a mobile phone, a palm-sized computing device, a personal digital assistant (PDA), etc. In one example, computing device 100 may be a computing device implemented with x86 hardware. In another example, computing device 100 may be a computing device implemented with PowerPC®, SPARC®, or other hardware. In the example shown in FIG. 1, computing device 100 may include virtual machines 110A-C, hypervisors 120A-C, hardware devices 130, and a network 140. While the computer system 100 of FIG. 1 depicts a particular number of nested hypervisors and nested virtual machines, in other implementations computer system 100 can include more or fewer levels of nested hypervisors and virtual machines.

Virtual machines 110A-C may execute guest executable code that uses an underlying emulation of the physical resources. The guest executable code may include a guest operating system, guest applications, guest device drivers, etc. Each of the virtual machines 110A-C may support hardware emulation, full virtualization, para-virtualization, operating system-level virtualization, or a combination thereof. Virtual machines 110A-C may have the same or different types of guest operating systems, such as Microsoft®, Windows®, Linux®, Solaris®, etc. Virtual machines 110A-C may execute guest operating systems that manage guest memory resources.

Hypervisor 120A may also be known as a virtual machine monitor (VMM) and may provide hypervisor 120B and virtual machines 110A-C with access to one or more features of the underlying hardware devices 130. Hypervisor 120A may be a Level 0 hypervisor, thus having the highest level of privilege within the computer system 100. In the example shown, hypervisor 120A may run directly on the hardware of computer system 100 (e.g., bare metal hypervisor). In other examples, hypervisor 120A may run on or within a host operating system (not shown). Hypervisor 120A may manage system resources, including access to hardware devices 130. In various implementations, hypervisor 120A may include a hypercall execution component 122A, a hypercall function chain 128A, and a VM context chain 126A.

Hypervisor 120B may also be known as a virtual machine monitor (VMM) and may provide virtual machines 110B-C with access to one or more features of the underlying hardware devices 130. Hypervisor 120B may be a level 1 (Level 1) hypervisor, thus having a lower privilege than hypervisor 120A. In the example shown, hypervisor 120B may run on or within a virtual machine 110A running on hypervisor 120A. Hypervisor 120B may manage system resources provided to hypervisor 120B by virtual machine 110A or by hypervisor 120A. In the example shown, hypervisor 120B may include a hypercall function generating component 125B.

Hypervisor 120C may also be known as a virtual machine monitor (VMM) and may provide virtual machine 110C with access to one or more features of the underlying hardware devices 130. Hypervisor 120B may be a level 2 (Level 2) hypervisor, thus having a lower privilege than hypervisors 120A-B. In the example shown, hypervisor 120C may run on or within a virtual machine 110B running on hypervisor 120B. Hypervisor 120C may manage system resources provided to hypervisor 120C by virtual machine 110B or by hypervisor 120B. In the example shown, hypervisor 120C may include a hypercall function generating component 125C.

In various implementations, hypercall execution component 122A of hypervisor 120A can receive hypercall function components generated by hypervisors 120B-C. A hypercall function component can be executable instructions perform the functionality associated with executing a hypercall issued by a VM. A hypercall function component can be a Berkeley Packet Filter (BPF) program, a compiled program, or other similar bytecode that can be used by the hypervisor 120A to execute instructions. In some implementations, a hypercall function component can be configured to receive information that references a memory location (e.g., a pointer, a register address, etc.) and one or more instructions that modify the information at that memory location. Similarly, the hypercall function component can include instructions that retrieves information from the memory location and moves it to another memory location.

For example, VM 110C that is managed by hypervisor 120C (Level 2 hypervisor) may execute a hypercall to perform a networking operation. VM 110C may expect hypervisor 120C to perform this operation by modifying a particular register associated with the VM context for VM 110C. In such instances the hypercall function generated by hypercall function generating component 125C (hypercall function component 126C) would be configured to perform that operation. Once the function has been generated, hypercall function generating component 125C can provide the hypercall function component 126C to hypercall execution component 122A. In various implementations, hypercall execution component 122A can receive the executable program, a location in memory where the program is stored (e.g., after it has been generated by the nested hypervisor), or the like. Hypercall execution component 122A can store the received hypercall function component 126C in a memory space associated with hypervisor 120A (e.g., hypercall function chain 128A), and associate the hypercall function component with its corresponding guest visible portion of the context for VM 110C (e.g., the visible state of VM 110C). Hypervisor 120A can maintain the VM context for all managed VMs 110A-C in VM context chain 126A.

Hypercall execution component 122A may also receive a separate hypercall function component (e.g., hypercall function component 126B) from hypercall function generating component 125B of hypervisor 120B (e.g., the Level 1 hypervisor) that manages VM 110B. In various implementations, the hypercall function generating component 125B may receive information from hypervisor 120C that indicates the functionality performed by hypercall function component 126C (generated by the Level 2 hypervisor 120C). In some implementations, hypercall function generating component 125B can receive the actual hypercall function component 126C generated by hypercall function generating component 125C (from the Level 2 hypervisor). In such instances, hypercall function generating component 125B (the Level 1 hypervisor) can translate the functionality performed by hypercall function component 126C into the functionality expected by VM 110B to complete the associated operation at that level of the system. For example, if VM 110C issues a hypercall to complete a networking operation that involves the Level 2 hypervisor modifying register A with a particular value, this may rely on the Level 1 hypervisor modifying a value in a different register at that level (e.g., modifying register B with that value). In such instances, the hypercall function generating component 125B can generate hypercall function component 126B to move the value from register A to register B.

Hypercall function generating component 125B can then provide hypercall function component 126B to hypervisor 120A to be stored in the hypercall function chain 128A. In some implementations, hypercall function generating component 125B can chain hypercall function component 126B with hypercall function 126A and provide the chain to hypervisor 120A. Alternatively, hypercall function generating component 125B can provide hypercall function component 126B without hypercall function component 126B, causing hypercall execution component 122A of hypervisor 120A to chain the functions together. The resulting chain of functions stored in hypercall function chain 128A can perform the corresponding functionality at each applicable level of the nested system to complete the associated hypercall without changing contexts between the levels and generating additional exits.

Subsequently, hypercall execution component 122A can detect a hypercall issued by VM 110C (the Level 3 VM), identify a stored hypercall function chain in hypercall function chain 128A associated with the type of hypercall, and execute the first function component in the chain (e.g., hypercall function component 126C) to modify the guest visible portion of the corresponding VM context in VM context chain 126A (e.g., the VM context for VM 110C).

Hypercall execution component 122A is described in further detail below with respect to FIG. 2. Hypercall function generating components 125B-C are described in further detail below with respect to FIG. 3.

Hardware devices 130 may provide hardware resources and functionality for performing computing tasks. Hardware devices 130 may include one or more physical storage devices 132, one or more physical processing devices 134, other computing devices, or a combination thereof. One or more of hardware devices 130 may be split up into multiple separate devices or consolidated into one or more hardware devices. Some of the hardware devices shown may be absent from hardware devices 130 and may instead be partially or completely emulated by executable code.

Physical storage devices 132 may include any data storage device that is capable of storing digital data and may include volatile or non-volatile data storage. Volatile data storage (e.g., non-persistent storage) may store data for any duration of time but may lose the data after a power cycle or loss of power. Non-volatile data storage (e.g., persistent storage) may store data for any duration of time and may retain the data beyond a power cycle or loss of power. In one example, physical storage devices 132 may be physical memory and may include volatile memory devices (e.g., random access memory (RAM)), non-volatile memory devices (e.g., flash memory, NVRAM), and/or other types of memory devices. In another example, physical storage devices 132 may include one or more mass storage devices, such as hard drives, solid state drives (SSD)), other data storage devices, or a combination thereof. In a further example, physical storage devices 132 may include a combination of one or more memory devices, one or more mass storage devices, other data storage devices, or a combination thereof, which may or may not be arranged in a cache hierarchy with multiple levels.

Physical processing devices 134 may include one or more processors that are capable of executing the computing tasks. Physical processing devices 134 may be a single core processor that is capable of executing one instruction at a time (e.g., single pipeline of instructions) or may be a multi-core processor that simultaneously executes multiple instructions. The instructions may encode arithmetic, logical, or I/O operations. In one example, physical processing devices 134 may be implemented as a single integrated circuit, two or more integrated circuits, or may be a component of a multi-chip module (e.g., in which individual microprocessor dies are included in a single integrated circuit package and hence share a single socket). A physical processing device may also be referred to as a central processing unit ("CPU").

Network 140 may be a public network (e.g., the internet), a private network (e.g., a local area network (LAN), a wide area network (WAN)), or a combination thereof. In one example, network 140 may include a wired or a wireless infrastructure, which may be provided by one or more wireless communications systems, such as a wireless fidelity (WiFi) hotspot connected with the network 140 and/or a wireless carrier system that can be implemented using various data processing equipment, communication towers, etc.

Figure 2:
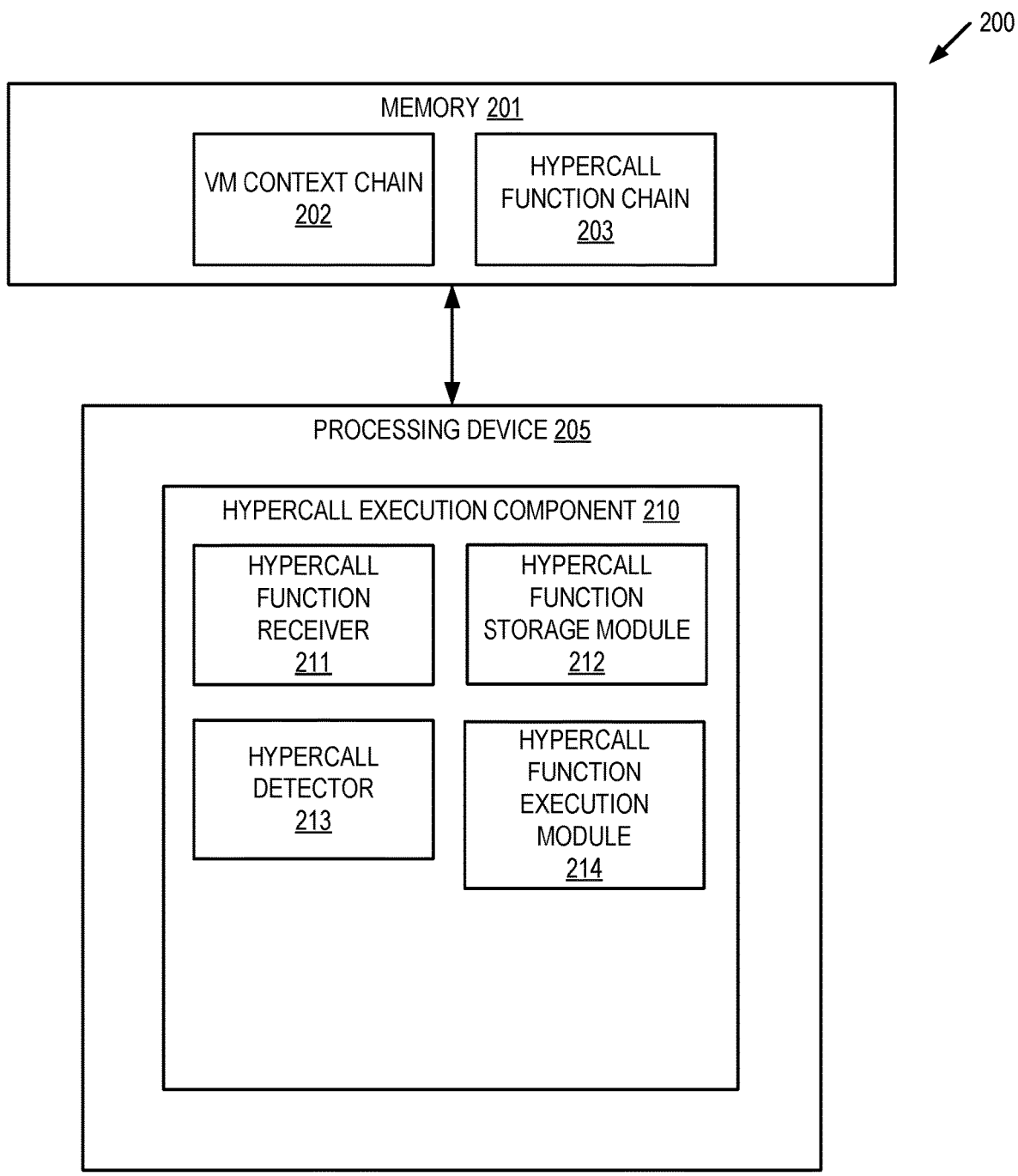
FIG. 2 depicts a block diagram illustrating an example of a hypercall execution component for facilitating hypercall acceleration for nested virtual machines, in accordance with one or more aspects of the present disclosure.

FIG. 2 depicts a block diagram illustrating an example of a hypercall execution component 210 for facilitating hypercall acceleration for nested virtual machines. In some implementations, hypercall execution component 210 may correspond to hypercall execution component 122A of FIG. 1. As shown in FIG. 2, hypercall execution component 210 may be a component of a computing apparatus 200 that includes a processing device 205, operatively coupled to a memory 201, to execute hypercall execution component 210. In some implementations, processing device 205 and memory 201 may correspond to processing device 702 and main memory 704 respectively as described below with respect to FIG. 7.

Hypercall execution component 210 may include hypercall function receiver 211, hypercall function storage module 212, hypercall detector 213, and hypercall function execution module 214. Alternatively, the functionality of one or more of hypercall function receiver 211, hypercall function storage module 212, hypercall detector 213, and hypercall function execution module 214 may be combined into a single module or divided into multiple sub-modules. In various implementations, hypercall execution component 210 may be executed by a Level 0 hypervisor that is executed by a host computer system. As described above with respect to FIG. 1, in an illustrative example, the Level 0 hypervisor may manage a Level 1 virtual machine (VM). In some implementations, a Level 1 VM runs a Level 1 hypervisor, the Level 1 hypervisor manages a Level 2 VM running a Level 2 hypervisor, and the Level 2 hypervisor manages a Level 3 VM running a Level 3 hypervisor. However, it should be noted that the phrase "a VM running a hypervisor" as used herein should be interpreted as the VM running that hypervisor directly, or within extra hypervisor levels. In addition, there can be any number of extra levels, including more or fewer levels of nested hypervisors and VMs than the levels specifically referenced herein.

Hypercall function receiver 211 is responsible for receiving, by the Level 0 hypervisor, a first hypercall function component from a Level 2 hypervisor, where the first hypercall function component performs a functionality associated with a hypercall issued by a Level 3 VM. As noted above, a hypercall function component can be a BPF program, a compiled program, or other similar bytecode that can be used by the Level 0 hypervisor to execute instructions to perform the functionality associated with the corresponding hypercall. In various implementations, the functionality can represent a set of instructions that are associated with modifying the VM context of the VM that issued the hypercall.

In some implementations, hypercall function receiver 211 can receive a hypercall function component from each nested hypervisor in the host computer system separately. In other words, each nested hypervisor can send a hypercall function component to the Level 0 hypervisor independently. Hypercall function receiver 211 can receive the individual hypercall function components and invoke hypercall function storage module 212 to chain the functions together and store the functions in hypercall functions in hypercall function chain 203 in memory 201 as described below.

In other implementations, hypercall function receiver 211 can receive a chain of hypercall function components. In such instances, the nested hypervisors can pass their corresponding hypercall function component to the next lowest nested hypervisor (e.g., the Level 2 hypervisor can pass its function component to the Level 1 hypervisor). The next lowest hypervisor can generate its own hypercall function component, chain it to the one received from the higher level hypervisor, and pass the chain of function components to the hypercall function receiver 211 of the Level 0 hypervisor. This nested function chaining process performed by the nested hypervisors is described in further detail below with respect to FIG. 3.

Hypercall function storage module 212 is responsible for storing the received hypercall function component in a memory space associated with the Level 0 hypervisor (e.g., hypercall function chain 203 of memory 201). In various implementations, hypercall function storage module 212 stores the received hypercall function component so it is associated with a VM context for the Level 3 VM (e.g., stored in VM context chain 202). As noted above, the Level 0 hypervisor may maintain the VM context information (e.g., CPU state, register values, etc.) for each nested VM in the nesting hierarchy that is managed by the Level 0 hypervisor. Once hypercall function storage module 212 stores the hypercall function component in hypercall function chain 203, it can determine the appropriate VM context associated with the nested hypervisor that provided the hypercall function component. Subsequently, hypercall function storage module 203 can associate the received hypercall function component with its corresponding VM context in the Level 0 hypervisor memory space (e.g., memory 201).

As noted above, in some implementations, hypercall function receiver 211 can receive a chain of hypercall function components. In such instances, hypercall function storage module 203 can store the entire chain of components in hypercall function chain 203. Once the chain has been stored, hypercall function receiver 211 can associate each component in the chain with its corresponding VM context in VM context chain 202.

Also as noted above, in some implementations, hypercall function receiver 211 can receive the hypercall function components from each nested hypervisor separately. In such instances, hypercall function storage module 203 can store each received hypercall function component as the components are received. If hypercall function storage module 203 determines that a received hypercall function component is associated with another hypercall function component received from a different nested hypervisor, the hypercall function components can be chained together.

For example, the Level 2 hypervisor may provide a hypercall function component that is to be executed to modify the VM context for the Level 3 VM in response to detecting a particular hypercall issued by the Level 3 VM. Hypercall function storage module 203 can store this received hypercall function component in the hypercall function chain 203 and associate it with the VM context for the Level 3 VM. In some implementations, the Level 1 hypervisor may be responsible for translating the updates of the Level 3 VM context into corresponding updates to the Level 2 VM context. In such instances, the Level 1 hypervisor may provide a corresponding hypercall function component to perform these modifications. Hypercall function storage module 203 can determine whether the component received from the Level 1 hypervisor is associated with a higher nested level component, and if so, chain the newly received component to the component from the higher nested level. To continue the example, hypercall function storage module 203 can determine that the component received from the Level 1 hypervisor is associated with the component received from the Level 2 hypervisor. Subsequently, hypercall function storage module 203 can chain the two modules together such that the component received from the higher level (e.g., Level 2 hypervisor) is executed first, then the component received from the next lower level (e.g., Level 1 hypervisor) would be executed.

Hypercall detector 213 is responsible for detecting, by the Level 0 hypervisor, a hypercall issued by a nested VM within the nested environment. In an illustrative example, hypercall detector 213 can detect a hypercall issued by the Level 3 VM managed by the Level 2 hypervisor. Alternatively, hypercall detector 213 can detect a hypercall issued by the Level 2 VM managed by the Level 1 hypervisor. In other implementations, with other nested levels, the hypercall detector 213 can detect a hypercall from any of the nested VMs in the nested environment.

In some implementations, hypercall detector 213 can determine whether there is a stored function chain associated with the detected hypercall. Upon detecting the hypercall, hypercall detector 213 can determine the VM context associated with the detected hypercall (e.g., by checking the VM context chain 203). Subsequently, hypercall detector 213 can determine whether there is a hypercall function component (or component chain) stored in hypercall function chain 203 that is associated with the identified VM context that can perform the detected hypercall operation. If so, hypercall detector 213 can invoke hypercall function execution module 214 to initiate the identified hypercall function chain for the detected hypercall.

If a stored function chain for the detected hypercall is not identified, hypercall detector 213 can invoke another component of the Level 0 hypervisor to process the hypercall by determining the nested hypervisor that manages the source VM (e.g., the VM that issued the hypercall) and passing control to that nested hypervisor.

Hypercall function execution module 214 is responsible for executing the hypercall function component identified by hypercall detector 213 to modify the VM context for the VM that issued the hypercall. Once the appropriate hypercall function component (or component chain) has been identified, hypercall function execution module 214 initiates execution of the component (or component chain). If a single function component is identified, hypercall function execution module 214 executes the single component to modify the associated VM context. Subsequently, hypercall function execution module 214 determines a completion status (e.g., a return code, a completion code stored in a portion of memory space 201, etc.) for the executed hypercall function component. Hypercall function execution module 214 can then return control to the hypervisor that manages the source VM for the issued hypercall based on the completion status of the executed hypercall function component. If the execution status indicates that the component executed successfully, control can be returned to the managing hypervisor.

Alternatively, if the execution status indicates an error condition, hypercall function execution module 214 can take a different action depending on the type of error. For example, if the hypercall related to a networking operation and the error condition indicates that a networking packet could not be processed, hypercall function execution module 214 can return control to the managing hypervisor to indicate that the operation failed. In another example, if the hypercall related to performing a privileged operation and the error condition indicates a security violation or memory problem, hypercall function execution module 214 can initiate termination of the VM that issued the hypercall.

If hypercall function execution module 214 determines that a function chain (e.g., a chain of related hypercall function components for multiple nested layers) is associated with the issued hypercall, hypercall execution module 214 initiates execution of the chain by executing the first component in the chain. Subsequently, hypercall function execution module 214 can determine a completion status (e.g., a return code, a completion code stored in a portion of memory space 201, etc.) for the executed hypercall function component. Hypercall function execution module 214 can then execute the next hypercall function component in the chain of components based on the completion status of the executed component. For example, if the completion status indicates that the next component in the chain is to be executed (e.g., an operation is to be performed by the next lower level hypervisor to translate the hypercall operation for that layer), hypercall function execution module 214 can initiate the next component in the chain. Alternatively, the completion status could indicate that no additional processing is required to complete the hypercall operation, and the subsequent components in the chain can be bypassed. In another example, the completion status can indicate that an error condition has occurred, which can cause hypercall function execution module 214 to take a different action depending on the type of error as described above.

In various implementations, hypercall function execution module 214 can use the completion status of the executed component to determine whether to return control to the hypervisor that manages the source VM for the issued hypercall. If the execution status of an intermediate component in the chain indicates that no addition processing is necessary, control can be returned to the managing hypervisor. Additionally, if the execution status of the final component in the chain indicates that all intermediate components have executed successfully, control can be returned to the managing hypervisor.

Figure 3:
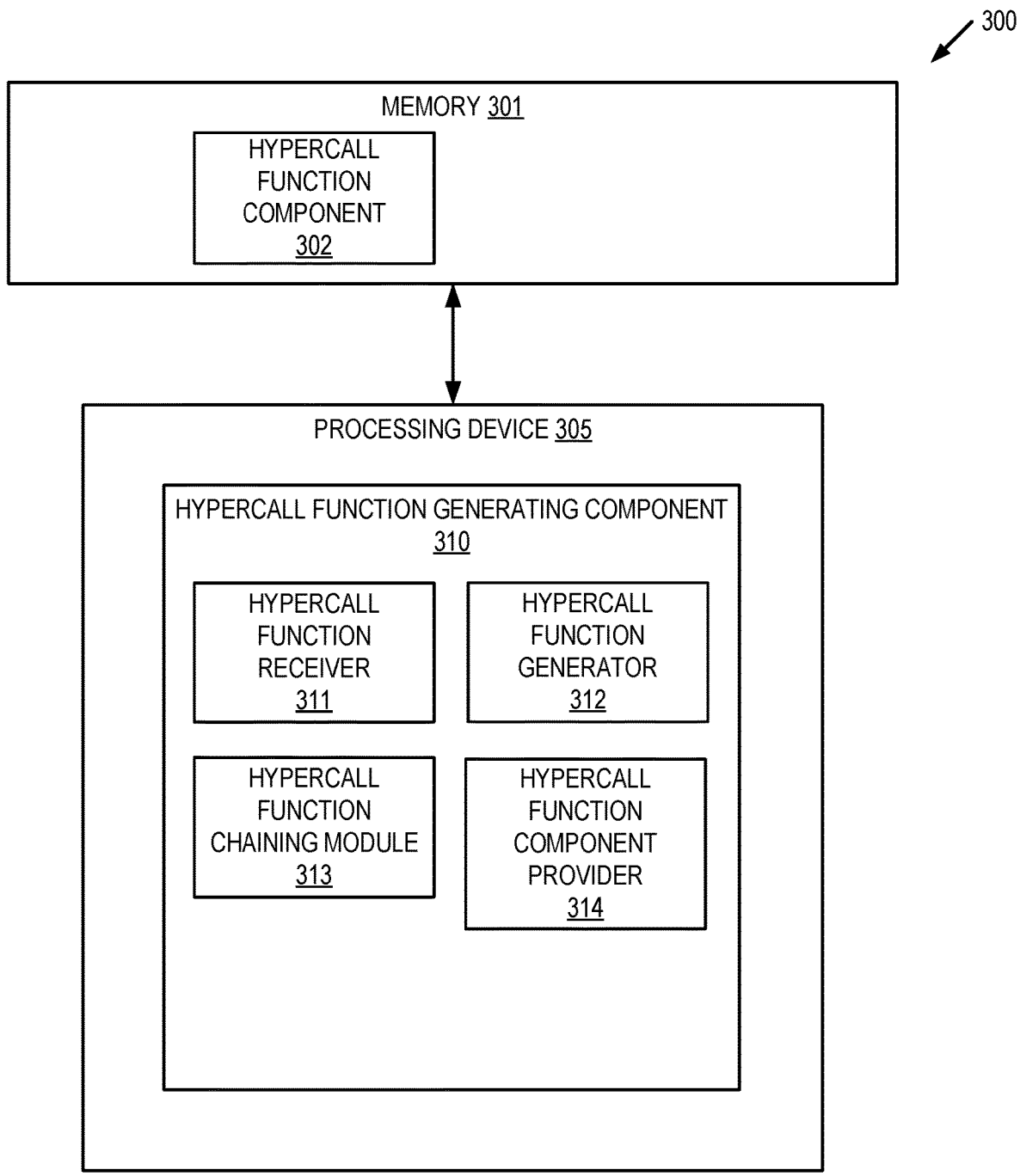
FIG. 3 depicts a block diagram illustrating an example of a hypercall function generating component for generating hypercall function components for nested virtual machines, in accordance with one or more aspects of the present disclosure.

FIG. 3 depicts a block diagram illustrating an example of a hypercall function generating component 310 for generating hypercall function components for nested virtual machines. In some implementations, hypercall function generating component 310 may correspond to hypercall function generating components 125B-C of FIG. 1. As shown in FIG. 3, hypercall function generating component 310 may be a component of a computing apparatus 300 that includes a processing device 305, operatively coupled to a memory 301, to execute hypercall function generating component 310. In some implementations, processing device 305 and memory 301 may correspond to processing device 702 and main memory 704 respectively as described below with respect to FIG. 7.

Hypercall function generating component 310 may include hypercall function receiver 311, hypercall function generator module 312, hypercall function chaining module 313, and hypercall function component provider module 314. Alternatively, the functionality of one or more of hypercall function receiver 311, hypercall function generator module 312, hypercall function chaining module 313, and hypercall function component provider module 314 may be combined into a single module or divided into multiple sub-modules. In various implementations, hypercall function generating component 310 may be executed by a Level 0 hypervisor that is executed by a host computer system. As described above with respect to FIG. 1, in an illustrative example, the Level 0 hypervisor may manage a Level 1 virtual machine running (VM) a Level 1 hypervisor, where the Level 1 hypervisor manages a Level 2 VM running a Level 2 hypervisor, and where the Level 2 hypervisor manages a Level 3 VM running a Level 3 hypervisor. In other implementations, more or fewer levels of nested hypervisors and VMs may be executed.

Hypercall function receiver 311 is responsible for receiving information from a higher nested level (e.g., a higher level nested hypervisor or VM) to facilitate generating a hypercall function component by a lower level nested hypervisor. In some implementations, a nested hypervisor at one level can receive information from a nested hypervisor at a higher level. For example, a Level 1 hypervisor can receive a function component from a Level 2 hypervisor, where the received function component performs a functionality associated with a hypercall issued by a Level 3 VM managed by the Level 2 hypervisor. A similar process can be performed by higher or lower levels of a nested virtualized environment. In other implementations, a nested hypervisor can receive information from the VM that is managed by that hypervisor. For example, a Level 2 hypervisor can receive instructions from a Level 3 VM. In such instances, the received instructions can indicate the functionality that the Level 3 VM expects the Level 2 hypervisor to perform when a particular hypercall is issued by the Level 3 VM.

Hypercall function generator module 312 is responsible for generating a hypercall function component that performs a functionality associated with a hypercall issued by the higher level VM. In various implementations, hypercall function generator module 312 generates the hypercall function component to execute instructions by a particular nested hypervisor to complete the operations necessary at that nested layer to perform the hypercall issued by a VM. For example, if a Level 3 VM issues a hypercall to perform a networking operation, the Level 2 hypervisor may receive instructions from the Level 3 VM which can cause hypercall function generator module 312 to generate a hypercall function component to perform those instructions. In such instances, the hypercall function generator module 312 can first validate the instructions from the Level 3 VM. The instructions can be validated by analyzing the instructions to make sure that the instructions are not trying to perform unauthorized privileged operations outside of the scope of the particular hypercall type. For example, a hypercall to perform a networking operation should not have access to protected memory that is not involved in transferring networking packets. Subsequently, hypercall function generator module 312 can generate the function component based on the validated instructions (e.g., by compiling the instructions into an executable module).

In other implementations, hypercall function generator module 312 can receive a hypercall function component from a higher level hypervisor and translate the functionality of the component for the higher level into instructions to be performed at the lower level. To continue the example from the previous paragraph, a Level 1 hypervisor can receive the hypercall function component from the Level 2 hypervisor (e.g., the component to be executed by the Level 2 hypervisor in response to the Level 3 VM issuing a particular hypercall). Subsequently, the hypercall function generator module 312 of the Level 1 hypervisor can determine whether any additional functionality is to be performed by the Level 1 hypervisor when the Level 3 VM issues the hypercall. If so, the hypercall generator module 312 of the Level 1 hypervisor can generate the hypercall function component for that nested level to perform the additional functionality.

In some implementations, after receiving the component from the higher level (e.g., from the Level 2 hypervisor), hypercall function generator module 312 can translate the instructions of the received component into instructions to be performed by the current level (e.g., the Level 1 hypervisor). For example, if the Level 2 component stores a particular value in Register A, and the Level 1 hypervisor expects that value to be in register B, then the hypercall function generator module 312 translates the instruction of the Level 2 component by generating an instruction that copies or moves the value stored in Register A to Register B. Alternatively, if both levels use the same Register A, but expect different values stored there, then the hypercall function generator module 312 can translate the instruction by generating a new instruction that stores the value expected by the Level 1 hypervisor.

Hypercall function chaining module 313 is responsible for chaining a function component received from a higher level to one generated at the lower level. To continue the above example, where the Level 1 hypervisor receives a first component from the Level 2 hypervisor and generates a second component, function chaining module 313 executed by the Level 1 hypervisor can chain the first component with the second component to generate a chain of components. In such instances, function chaining module 313 can determine dependencies between the generated components and configure the function chain accordingly. For example, if function chaining module 313 determines that the first component is a dependency of the second component (e.g., the Level 1 component is to execute after completion of the Level 2 component), the chain of components can be configured such that the Level 2 component executes first, then triggers the Level 1 component. Conversely, if function chaining module 313 determines that the first component is not a dependency of the second component (e.g., the Level 1 component need not execute after completion of the Level 2 component), the chain of components can be configured such that the Level 1 component can be bypassed based on the results of the first component.

Hypercall function component provider module 314 is responsible for providing the chain of function components to the Level 0 hypervisor to cause the Level 0 hypervisor to store the chain of function components in a memory space associated with the level 0 hypervisor. In various implementations, hypercall function component provider module 314 can store the component chain in a shared memory space and provide a notification to the Level 0 hypervisor that indicates the location of the chain. Alternatively, hypercall function component provider module 314 can copy the component chain to an area of memory to which the Level 0 hypervisor has access, causing the Level 0 hypervisor to retrieve the function chain. In other implementations other similar methods of providing the function chain to the Level 0 hypervisor may be used.

Figure 4:
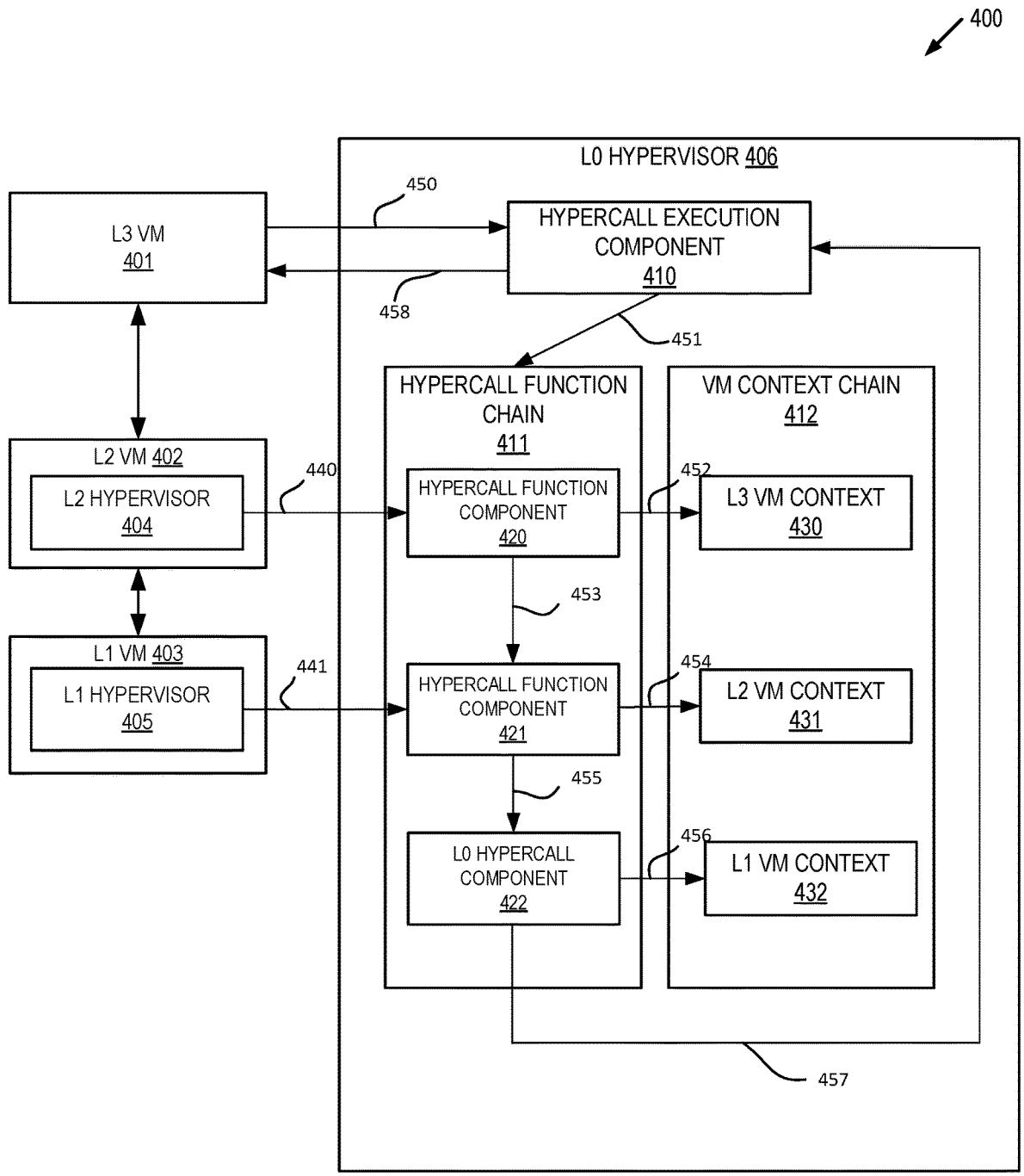
FIG. 4 depicts an illustration of a hypercall execution component that facilitates hypercall acceleration for nested virtual machines, in accordance with one or more aspects of the present disclosure.

FIG. 4 depicts an illustration of a hypercall execution component that facilitates hypercall acceleration for nested virtual machines. In various implementations, the hypercall execution component 452, hypercall function chain 454, and VM context chain 453 can correspond to the hypercall execution component 122, hypercall function chain 124, and VM context chain 123 of FIG. 1. As shown in FIG. 4, a computer system 400 can execute an L0 hypervisor 406 that manages an L1 VM 403 running L1 hypervisor 405. L1 hypervisor 405 manages L2 VM 402 running L2 hypervisor 404. L2 Hypervisor 404 manages L3 VM 401. Although for simplicity of illustration only three levels are depicted in FIG. 4, in other implementations, aspects of the present disclosure may be applied to fewer nested layers or additional nested layers than those depicted.

As described above with respect to FIGS. 2-3, L2 hypervisor 404 can receive information from L3VM 401 that allows L2 hypervisor 404 (e.g., a hypercall function generating component) to generate a hypercall function component (hypercall function component 420) to modify the VM context for L3 VM 401 (e.g., L3 VM context 430) in response to a hypercall issued by L3 VM 401. The L2 hypervisor 404 can subsequently provide hypercall function component 420 to hypercall execution component 410 (operation 440) to be stored in hypercall function chain 411. Similarly, L1 hypervisor 405 can receive information from L2 hypervisor 404 that allows L1 hypervisor 405 to generate hypercall function component 421 to modify the VM context for L2 VM 402 (e.g., L2 VM context 431) in response to the hypercall issued by L3 VM 401. The L1 hypervisor 405 can subsequently provide hypercall function component 421 to hypercall execution component 410 (operation 441) to be stored in hypercall function chain 411.

As shown, hypercall function component 420 is a dependency to hypercall function component 421, so hypercall execution component 410 can store the two components chained together (421 executing after completion of 421). In various implementations, the L0 hypervisor 406 may append an additional component to the chain that corresponds to any logic resident to the L0 hypervisor that should be executed to complete the functionality associated with the hypercall (e.g., L0 hypercall component 422 that modifies L1 VM context 432).

Subsequently, L3 VM 401 can issue a hypercall (operation 450) to perform a privileged operation, which causes an exit to L0 hypervisor 406. Hypercall execution component 410 can then be invoked to identify any chain of hypercall function components present in hypercall function chain 411 to perform the functionality associated with each nested level to process the hypercall. As shown, hypercall execution component 410 can initiate hypercall function component 420 (operation 451) to modify L3 VM context 430 (operation 452). As described above, the subsequent components in the function chain can be executed based on the execution status of the previous component. Thus, hypercall function component 420, upon successful completion, can initiate hypercall function component 421 (operation 453) to modify L2 VM context 431 (operation 454). Similarly, hypercall function component 421, upon successful completion, can initiate L0 hypercall component 422 (operation 455) to modify L1 VM context 432 (operation 456). Upon successful completion of the last component in the chain (or an indication that any of the intermediate components can be bypassed), control is returned to hypercall execution component 410 (operation 457). Hypercall execution component 410 can subsequently return control to the L3 VM 401 via the L2 hypervisor 404 (operation 458).

Figure 5:
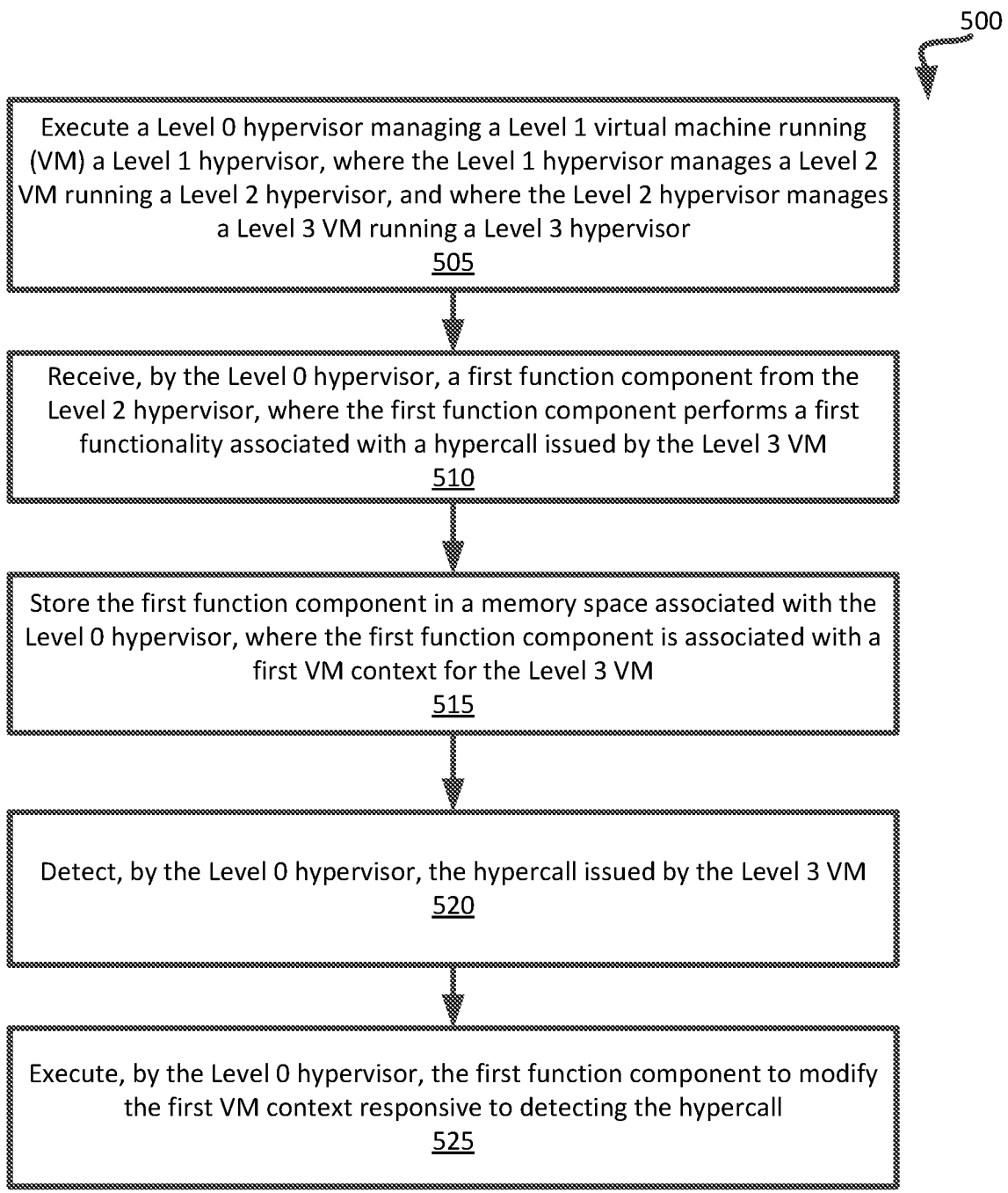
FIG. 5 depicts a flow diagram of another method for facilitating hypercall acceleration for nested virtual machines, in accordance with one or more aspects of the present disclosure.

FIG. 5 depicts a flow diagram of an example method 500 for facilitating hypercall acceleration for nested virtual machines. The method may be performed by processing logic that may comprise hardware (circuitry, dedicated logic, etc.), computer readable instructions (run on a general purpose computer system or a dedicated machine), or a combination of both. In an illustrative example, method 500 may be performed by hypercall execution component 122A in FIG. 1. Alternatively, some or all of method 500 might be performed by another module or machine. It should be noted that blocks depicted in FIG. 5 could be performed simultaneously or in a different order than that depicted.

At block 505, processing logic executes a Level 0 hypervisor managing a Level 1 virtual machine (VM). At block 510, processing logic receives, by the Level 0 hypervisor, a first function component from a Level 2 hypervisor managing a Level 3 VM, where the first function component performs a first functionality associated with a hypercall issued by the Level 3 VM. At block 515, processing logic stores the first function component in a memory space associated with the Level 0 hypervisor, where the first function component is associated with a first VM context for the Level 3 VM. At block 520, processing logic detects, by the Level 0 hypervisor, the hypercall issued by the Level 3 VM. At block 525, processing logic executes, by the Level 0 hypervisor, the first function component to modify the first VM context responsive to detecting the hypercall at block 520.

Figure 6:
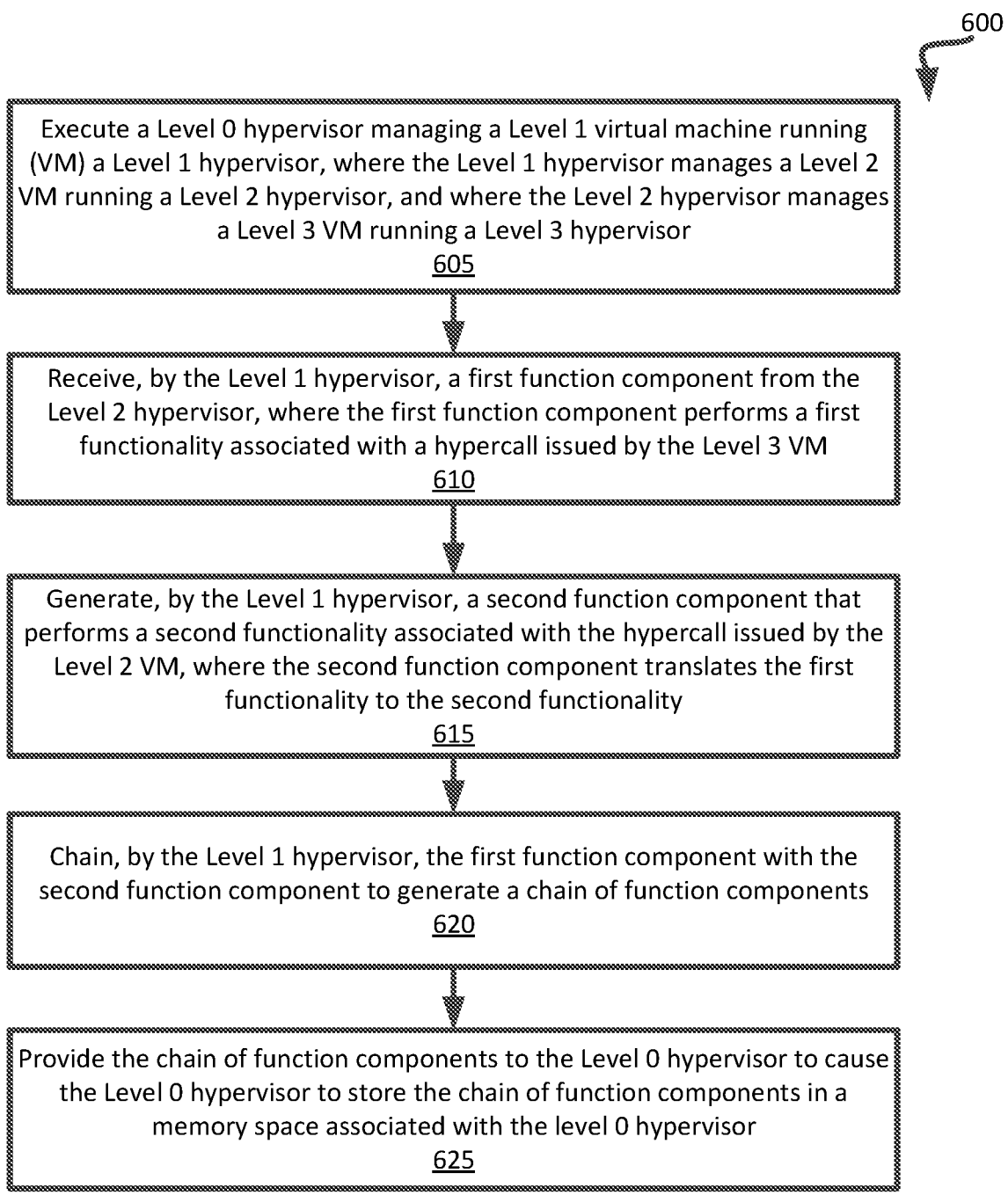
FIG. 6 depicts a flow diagram of another method for facilitating generating hypercall function components for nested virtual machines, in accordance with one or more aspects of the present disclosure.

FIG. 6 depicts a flow diagram of an example method 600 for facilitating generating hypercall function components for nested virtual machines. The method may be performed by processing logic that may comprise hardware (circuitry, dedicated logic, etc.), computer readable instructions (run on a general purpose computer system or a dedicated machine), or a combination of both. In an illustrative example, method 600 may be performed by hypercall function generating component 125B-C in FIG. 1. Alternatively, some or all of method 600 might be performed by another module or machine. It should be noted that blocks depicted in FIG. 6 could be performed simultaneously or in a different order than that depicted.

At block 605, processing logic executes a Level 0 hypervisor managing a Level 1 virtual machine (VM). At block 610, processing logic receives, by a Level 1 hypervisor managing a Level 2 VM, a first function component from a Level 2 hypervisor managing a Level 3 VM, where the first function component performs a first functionality associated with a hypercall issued by the Level 3 VM.

At block 615, processing logic generates, by the Level 1 hypervisor, a second function component that performs a second functionality associated with the hypercall issued by the Level 2 VM, where the second function component translates the first functionality to the second functionality. At block 620, processing logic chains, by the Level 1 hypervisor, the first function component with the second function component to generate a chain of function components. At block 625, processing logic provides the chain of function components to the Level 0 hypervisor to cause the Level 0 hypervisor to store the chain of function components in a memory space associated with the level 0 hypervisor.

Figure 7:
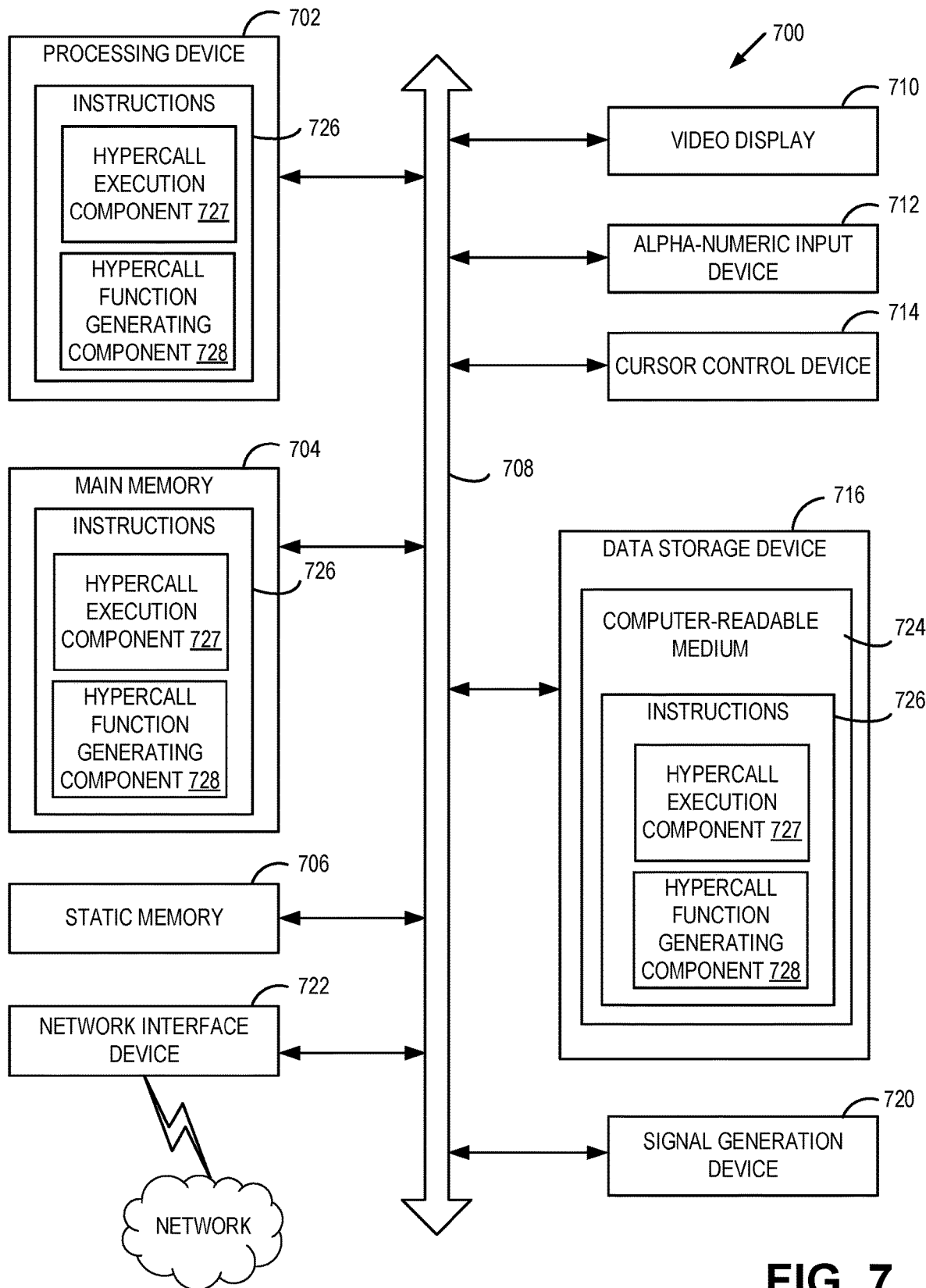
FIG. 7 depicts a block diagram of an illustrative computer system operating in accordance with one or more aspects of the present disclosure.

FIG. 7 depicts an example computer system 700 which can perform any one or more of the methods described herein. In one example, computer system 700 may correspond to computer system 100 of FIG. 1. The computer system may be connected (e.g., networked) to other computer systems in a LAN, an intranet, an extranet, or the Internet. The computer system may operate in the capacity of a server in a client-server network environment. The computer system may be a personal computer (PC), a set-top box (STB), a server, a network router, switch or bridge, or any device capable of executing a set of instructions (sequential or otherwise) that specify actions to be taken by that device. Further, while a single computer system is illustrated, the term "computer" shall also be taken to include any collection of computers that individually or jointly execute a set (or multiple sets) of instructions to perform any one or more of the methods discussed herein.

The exemplary computer system 700 includes a processing device 702, a main memory 704 (e.g., read-only memory (ROM), flash memory, dynamic random access memory (DRAM) such as synchronous DRAM (SDRAM)), a static memory 706 (e.g., flash memory, static random access memory (SRAM)), and a data storage device 716, which communicate with each other via a bus 708.

Processing device 702 represents one or more general-purpose processing devices such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 702 may also be one or more special-purpose processing devices such as an application specific integrated circuit (ASIC), a field programmable gate array (FPGA), a digital signal processor (DSP), network processor, or the like. The processing device 702 is configured to execute processing logic (e.g., instructions 726) that includes hypercall execution component 727 and/or hypercall function generating component 728 for performing the operations and steps discussed herein (e.g., corresponding to hypercall execution component 122 and/or hypercall function generating components 125B-C of FIG. 1, and the method of FIGS. 4-5, etc.).

The computer system 700 may further include a network interface device 722. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 720 (e.g., a speaker). In one illustrative example, the video display unit 710, the alphanumeric input device 712, and the cursor control device 714 may be combined into a single component or device (e.g., an LCD touch screen).

The data storage device 716 may include a non-transitory computer-readable medium 724 on which may store instructions 726 that includes hypercall execution component 727 and/or hypercall function generating component 728 for performing the operations and steps discussed herein (e.g., corresponding to hypercall execution component 122 and/or hypercall function generating components 125B-C of FIG. 1, and the method of FIGS. 4-5, etc.) embodying any one or more of the methodologies or functions described herein. Hypercall execution component 727 and/or hypercall function generating component 728 may also reside, completely or at least partially, within the main memory 704 and/or within the processing device 702 during execution thereof by the computer system 700, the main memory 704 and the processing device 702 also constituting computer-readable media. Hypercall execution component 727 and/or hypercall function generating component 728 may further be transmitted or received over a network via the network interface device 722.

While the computer-readable storage medium 724 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that aspects of the present disclosure may be practiced without these specific details. In some instances, well-known structures and devices are shown in block diagram form, rather than in detail, in order to avoid obscuring the present disclosure.

Unless specifically stated otherwise, as apparent from the following discussion, it is appreciated that throughout the description, discussions utilizing terms such as "receiving," "executing," "generating," "chaining," "providing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the specific purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Aspects of the disclosure presented herein are not inherently related to any particular computer or other apparatus. Various general purpose systems may be used with programs in accordance with the teachings herein, or it may prove convenient to construct more specialized apparatus to perform the specified method steps. The structure for a variety of these systems will appear as set forth in the description below. In addition, aspects of the present disclosure are not described with reference to any particular programming language. It will be appreciated that a variety of programming languages may be used to implement the teachings of the disclosure as described herein.

Aspects of the present disclosure may be provided as a computer program product that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not have an ordinal meaning according to their numerical designation.

Other computer system designs and configurations may also be suitable to implement the system and methods described herein. The following examples illustrate various implementations in accordance with one or more aspects of the present disclosure.

Example 1 is a method comprising executing, by a host computer system, a Level 0 hypervisor managing a Level 1 virtual machine (VM); receiving, by the Level 0 hypervisor, a first function component from a Level 2 hypervisor managing a Level 3 VM, wherein the first function component performs a first functionality associated with a hypercall issued by the Level 3 VM; storing the first function component in a memory space associated with the Level 0 hypervisor, wherein the first function component is associated with a first VM context for the Level 3 VM; detecting, by the Level 0 hypervisor, the hypercall issued by the Level 3 VM; and responsive to detecting the hypercall, executing, by the Level 0 hypervisor, the first function component to modify the first VM context.

Example 2 is the method of Example 1, further comprising determining, by the Level 0 hypervisor, a completion status of the first function component; and returning control to the Level 2 hypervisor in view of the completion status.

Example 3 is the method of Example 1, further comprising receiving, by the Level 0 hypervisor, a second function component from the Level 2 hypervisor, wherein the second function component performs a second functionality associated with the hypercall issued by the Level 3 VM; storing the second function component in the memory space associated with the Level 0 hypervisor, wherein the second function component is associated with a second VM context for a Level 2 VM managed by a Level 1 hypervisor; and chaining, by the level 0 hypervisor, the second function component with the first function component.

Example 4 is the method of Example 3, further comprising determining, by the Level 0 hypervisor, a completion status of the first function component; and executing, by the Level 0 hypervisor, the second function component in view of the completion status, the second function component to modify the second VM context.

Example 5 is the method of Example 4, further comprising determining, by the Level 0 hypervisor, a second completion status of the second function component; and returning control to the Level 2 hypervisor in view of the second completion status.

Example 6 is the method of Example 3, wherein the first functionality comprises a first set of instructions that perform a first modification of the first VM context.

Example 7 is the method of Example 6, wherein the second functionality comprises a second set of instructions that perform a second modification of the second VM context, and wherein the second set of instructions translate the first modification of the first VM context into the second modification of the second VM context.

Example 8 is a system comprising a memory, and a processing device, operatively coupled to the memory, to: execute, by a host computer system, a Level 0 hypervisor managing a Level 1 virtual machine (VM); receive, by the Level 0 hypervisor, a first function component from a Level 2 hypervisor managing a Level 3 VM, wherein the first function component performs a first functionality associated with a hypercall issued by the Level 3 VM; store the first function component in a memory space associated with the Level 0 hypervisor, wherein the first function component is associated with a first VM context for the Level 3 VM; detect, by the Level 0 hypervisor, the hypercall issued by the Level 3 VM; and responsive to detecting the hypercall, execute, by the Level 0 hypervisor, the first function component to modify the first VM context.

Example 9 is the system of Example 8, wherein the processing device is further to: determine, by the Level 0 hypervisor, a completion status of the first function component; and return control to the Level 2 hypervisor in view of the completion status.

Example 10 is the system of Example 8, wherein the processing device is further to: receive, by the Level 0 hypervisor, a second function component from the Level 2 hypervisor, wherein the second function component performs a second functionality associated with the hypercall issued by the Level 3 VM; store the second function component in the memory space associated with the Level 0 hypervisor, wherein the second function component is associated with a second VM context for a Level 2 VM managed by a Level 1 hypervisor; and chain, by the level 0 hypervisor, the second function component with the first function component.

Example 11 is the system of Example 10, wherein the processing device is further to: determine, by the Level 0 hypervisor, a completion status of the first function component; and execute, by the Level 0 hypervisor, the second function component in view of the completion status, the second function component to modify the second VM context.

Example 12 is the system of Example 11, wherein the processing device is further to: determine, by the Level 0 hypervisor, a second completion status of the second function component; and return control to the Level 2 hypervisor in view of the second completion status.

Example 13 is the system of Example 10, wherein the first functionality comprises a first set of instructions that perform a first modification of the first VM context, and wherein the second functionality comprises a second set of instructions that perform a second modification of the second VM context, and wherein the second set of instructions translate the first modification of the first VM context into the second modification of the second VM context.

Example 14 is a non-transitory computer readable medium comprising instructions, which when accessed by a processing device, cause the processing device to: execute, by a host computer system, a Level 0 hypervisor managing a Level 1 virtual machine (VM); receive, by the Level 0 hypervisor, a first function component from a Level 2 hypervisor managing a Level 3 VM, wherein the first function component performs a first functionality associated with a hypercall issued by the Level 3 VM; detect, by the Level 0 hypervisor, the hypercall issued by the Level 3 VM; and execute, by the Level 0 hypervisor, the first function component to modify a first VM context for the Level 3 VM in view of the hypercall.

Example 15 is the non-transitory computer readable medium of Example 14, wherein the processing device is further to: determine, by the Level 0 hypervisor, a completion status of the first function component; and return control to the Level 2 hypervisor in view of the completion status.

Example 16 is the non-transitory computer readable medium of Example 14, wherein the processing device is further to: store the first function component in a memory space accessible to the Level 0 hypervisor, wherein the first function component is associated with the first VM context for the Level 3 VM; receive, by the Level 0 hypervisor, a second function component from the Level 2 hypervisor, wherein the second function component performs a second functionality associated with the hypercall issued by the Level 3 VM; store the second function component in the memory space associated with the Level 0 hypervisor, wherein the second function component is associated with a second VM context for a Level 2 VM managed by a Level 1 hypervisor; and chain, by the level 0 hypervisor, the second function component with the first function component.

Example 17 is the non-transitory computer readable medium of Example 16, wherein the processing device is further to: determine, by the Level 0 hypervisor, a completion status of the first function component; and execute, by the Level 0 hypervisor, the second function component in view of the completion status, the second function component to modify the second VM context.

Example 18 is the non-transitory computer readable medium of Example 17, wherein the processing device is further to: determine, by the Level 0 hypervisor, a second completion status of the second function component; and return control to the Level 2 hypervisor in view of the second completion status.

Example 19 is the non-transitory computer readable medium of Example 16, wherein the first functionality comprises a first set of instructions that perform a first modification of the first VM context.

Example 20 is the non-transitory computer readable medium of Example 19, wherein the second functionality comprises a second set of instructions that perform a second modification of the second VM context, and wherein the second set of instructions translate the first modification of the first VM context into the second modification of the second VM context.

Example 21 is a method comprising executing, by a host computer system, a Level 0 hypervisor managing a Level 1 virtual machine (VM); receiving, by the Level 1 hypervisor, a first function component from a Level 2 hypervisor managing a Level 3 VM, wherein the first function component performs a first functionality associated with a hypercall issued by the Level 3 VM; generating, by a Level 1 hypervisor managing a Level 2 VM, a second function component that performs a second functionality associated with the hypercall issued by the Level 2 VM, and wherein the second function component translates the first functionality to the second functionality; chaining, by the Level 1 hypervisor, the first function component with the second function component to generate a chain of function components; and providing the chain of function components to the Level 0 hypervisor to cause the Level 0 hypervisor to store the chain of function components in a memory space associated with the level 0 hypervisor.

Example 22 is the method of Example 21, further comprising: receiving, by the Level 2 hypervisor, instructions from the Level 3 VM pertaining to the first functionality; validating, by the Level 2 hypervisor, the instructions from the Level 3 VM; generating, by the Level 2 hypervisor, the first function component in view of the validated instructions; and providing, by the Level 2 hypervisor, the first function component to the Level 1 hypervisor.

Example 23 is the method of Example 21, further comprising: receiving, by the Level 1 hypervisor, instructions from the Level 2 VM pertaining to the second functionality; validating, by the Level 1 hypervisor, the instructions from the Level 2 VM; translating, by the Level 1 hypervisor, the instructions for the second functionality in view of the first functionality; and generating, by the Level 1 hypervisor, the second function component in view of the validated instructions.

Example 24 is the method of Example 21, further comprising: determining that the first function component is a dependency of the second function component; and configuring the chain of function components in view of the dependency.

Example 25 is the method of Example 21, further comprising: determining that the first function component is not a dependency of the second function component; and configuring the chain of function components to indicate that the second function component is to be bypassed.

Example 26 is the method of Example 21, further comprising: responsive to detecting the hypercall issued by the Level 3 VM, causing the Level 0 hypervisor to execute one or more of the function components in the chain of function components.

Example 27 is a system comprising a memory, and a processing device, operatively coupled to the memory, to: execute, by a host computer system, a Level 0 hypervisor managing a Level 1 virtual machine (VM); receive, by a Level 1 hypervisor managing a Level 2 VM, a first function component from the Level 2 hypervisor, wherein the first function component performs a first functionality associated with a hypercall issued by the Level 3 VM; generate, by the Level 1 hypervisor, a second function component that performs a second functionality associated with the hypercall issued by the Level 2 VM, and wherein the second function component translates the first functionality to the second functionality; chain, by the Level 1 hypervisor, the first function component with the second function component to generate a chain of function components; and provide the chain of function components to the Level 0 hypervisor to cause the Level 0 hypervisor to store the chain of function components in a memory space associated with the level 0 hypervisor.

Example 28 is the system of Example 27, wherein the processing device is further to: receive, by the Level 2 hypervisor, instructions from the Level 3 VM pertaining to the first functionality; validate, by the Level 2 hypervisor, the instructions from the Level 3 VM; generate, by the Level 2 hypervisor, the first function component in view of the validated instructions; and provide, by the Level 2 hypervisor, the first function component to the Level 1 hypervisor.

Example 29 is the system of Example 27, wherein the processing device is further to: receive, by the Level 1 hypervisor, instructions from the Level 2 VM pertaining to the second functionality; validate, by the Level 1 hypervisor, the instructions from the Level 2 VM; translate, by the Level 1 hypervisor, the instructions for the second functionality in view of the first functionality; and generate, by the Level 1 hypervisor, the second function component in view of the validated instructions.

Example 30 is the system of Example 27, wherein the processing device is further to: determine that the first function component is a dependency of the second function component; and configure the chain of function components in view of the dependency.

Example 31 is the system of Example 27, wherein the processing device is further to: determine that the first function component is not a dependency of the second function component; and configure the chain of function components to indicate that the second function component is to be bypassed.

Example 32 is the system of Example 27, wherein the processing device is further to: responsive to detecting the hypercall issued by the Level 3 VM, causing the Level 0 hypervisor to execute one or more of the function components in the chain of function components.

Example 33 is a non-transitory computer readable medium comprising instructions, which when accessed by a processing device, cause the processing device to: execute, by a host computer system, a Level 0 hypervisor managing a Level 1 virtual machine (VM); receive, by a Level 1 hypervisor managing a Level 2 VM, a first function component from the Level 2 hypervisor, wherein the first function component performs a first functionality associated with a hypercall issued by the Level 3 VM; generate, by the Level 1 hypervisor, a second function component that performs a second functionality associated with the hypercall issued by the Level 2 VM, and wherein the second function component translates the first functionality to the second functionality; chain, by the Level 1 hypervisor, the first function component with the second function component to generate a chain of function components; and provide the chain of function components to the Level 0 hypervisor to cause the Level 0 hypervisor to store the chain of function components in a memory space associated with the level 0 hypervisor.

Example 34 is the non-transitory computer readable medium of Example 33, wherein the processing device is further to: receive, by the Level 2 hypervisor, instructions from the Level 3 VM pertaining to the first functionality; validate, by the Level 2 hypervisor, the instructions from the Level 3 VM; generate, by the Level 2 hypervisor, the first function component in view of the validated instructions; and provide, by the Level 2 hypervisor, the first function component to the Level 1 hypervisor.

Example 35 is the non-transitory computer readable medium of Example 33, wherein the processing device is further to: receive, by the Level 1 hypervisor, instructions from the Level 2 VM pertaining to the second functionality; validate, by the Level 1 hypervisor, the instructions from the Level 2 VM; translate, by the Level 1 hypervisor, the instructions for the second functionality in view of the first functionality; and generate, by the Level 1 hypervisor, the second function component in view of the validated instructions.

Example 36 is the non-transitory computer readable medium of Example 33, wherein the processing device is further to: determine that the first function component is a dependency of the second function component; and configure the chain of function components in view of the dependency.

Example 37 is the non-transitory computer readable medium of Example 33, wherein the processing device is further to: determine that the first function component is not a dependency of the second function component; and configure the chain of function components to indicate that the second function component is to be bypassed.

Example 38 is the non-transitory computer readable medium of Example 33, wherein the processing device is further to: responsive to detecting the hypercall issued by the Level 3 VM, causing the Level 0 hypervisor to execute one or more of the function components in the chain of function components.

Example 39 is an apparatus comprising means for executing, by a host computer system, a Level 0 hypervisor managing a Level 1 virtual machine (VM); means for receiving, by the Level 0 hypervisor, a first function component from a Level 2 hypervisor managing a Level 3 VM, wherein the first function component performs a first functionality associated with a hypercall issued by the Level 3 VM; means for storing the first function component in a memory space associated with the Level 0 hypervisor, wherein the first function component is associated with a first VM context for the Level 3 VM; means for detecting, by the Level 0 hypervisor, the hypercall issued by the Level 3 VM; and means for responsive to detecting the hypercall, executing, by the Level 0 hypervisor, the first function component to modify the first VM context.

What is claimed is:

1. A method comprising:
    executing, by a host computer system, a Level 0 hypervisor managing a Level 1 virtual machine (VM);
    receiving, by a Level 1 hypervisor managing a Level 2 VM, a first function component from a Level 2 hypervisor managing a Level 3 VM, wherein the first function component performs a first functionality associated with a hypercall issued by the Level 3 VM, wherein the first function component performs a first modification of a context of the Level 2 VM;
    generating, by the Level 1 hypervisor, a second function component that performs a second functionality associated with the hypercall issued by the Level 3 VM; and
    responsive to detecting the hypercall issued by the Level 3 VM, causing the Level 0 hypervisor to
    directly perform, without transferring control away from the Level 0 hypervisor and using the first function component and the second function component, the first modification of the context of the Level 2 VM.

2. The method of claim 1, further comprising:
    determining, by the Level 0 hypervisor, a completion status of the first function component; and
    returning control to the Level 2 hypervisor in view of the completion status.

3. The method of claim 1, wherein directly performing the first modification of the context of the Level 2 VM comprises:
    determining, by the Level 0 hypervisor, a completion status of the first function component; and
    executing, by the Level 0 hypervisor, the second function component in view of the completion status, the second function component to modify the context of the Level 2 VM.

4. The method of claim 3, further comprising:
determining, by the Level 0 hypervisor, a second completion status of the second function component; and
returning control to the Level 2 hypervisor in view of the second completion status.

5. The method of claim 1, wherein the second functionality is implemented by a second set of instructions that translates the first modification of the context of the Level 2 VM into a second modification of a context of the Level 1 VM.

6. The method of claim 1, wherein the first function component is generated by the Level 2 hypervisor based on instructions received from the Level 3 VM.

7. The method of claim 1, wherein the second function component is generated by the Level 1 hypervisor based on instructions received from the Level 2 VM.

8. A system comprising:
a memory; and
a processing device, operatively coupled to the memory, the processing device configured to:
execute a Level 0 hypervisor managing a Level 1 virtual machine (VM);
receive, by a Level 1 hypervisor managing a Level 2 VM, a first function component from a Level 2 hypervisor managing a Level 3 VM, wherein the first function component performs a first functionality associated with a hypercall issued by the Level 3 VM, wherein the first function component performs a first modification of a context of the Level 2 VM;
generate, by the Level 1 hypervisor, a second function component that performs a second functionality associated with the hypercall issued by the Level 3 VM; and
responsive to detecting the hypercall issued by the Level 3 VM, cause the Level 0 hypervisor to
directly perform, without transferring control away from the Level 0 hypervisor and using the first function component and the second function component, the first modification of the context of the Level 2 VM.

9. The system of claim 8, wherein the processing device is further to:
determine, by the Level 0 hypervisor, a completion status of the first function component; and
return control to the Level 2 hypervisor in view of the completion status.

10. The system of claim 8, wherein to directly perform the first modification of the context of the Level 2 VM, the processing device is to:
determine, by the Level 0 hypervisor, a completion status of the first function component; and
execute, by the Level 0 hypervisor, the second function component in view of the completion status, the second function component to modify the context of the Level 2 VM.

11. The system of claim 10, wherein the processing device is further to:
determine, by the Level 0 hypervisor, a second completion status of the second function component; and
return control to the Level 2 hypervisor in view of the second completion status.

12. The system of claim 8, wherein the second functionality is implemented by a second set of instructions that translates the first modification of the context of the Level 2 VM into a second modification of a context of the Level 1 VM.

13. A non-transitory computer readable storage medium comprising executable instructions, which when executed by a processing device, cause the processing device to:
execute a Level 0 hypervisor managing a Level 1 virtual machine (VM);
receive, by a Level 1 hypervisor managing a Level 2 VM, a first function component from a Level 2 hypervisor managing a Level 3 VM, wherein the first function component performs a first functionality associated with a hypercall issued by the Level 3 VM, wherein the first function component performs a first modification of a context of the Level 2 VM;
generate, by the Level 1 hypervisor, a second function component that performs a second functionality associated with the hypercall issued by the Level 3 VM; and
responsive to detecting the hypercall issued by the Level 3 VM, cause the Level 0 hypervisor to
directly perform, without transferring control away from the Level 0 hypervisor and using the first function component and the second function component, the first modification of the context of the Level 2 VM.

14. The non-transitory computer readable storage medium of claim 13, further comprising executable instructions, which when executed by the processing device, cause the processing device to:
determine, by the Level 0 hypervisor, a completion status of the first function component; and
return control to the Level 2 hypervisor in view of the completion status.

15. The non-transitory computer readable storage medium of claim 13, wherein, to directly perform the first modification of the context of the Level 2 VM, the processing device is to:
determine, by the Level 0 hypervisor, a completion status of the first function component; and
execute, by the Level 0 hypervisor, the second function component in view of the completion status, the second function component to modify the context of the Level 2 VM.

16. The non-transitory computer readable storage medium of claim 13, wherein the first function component is generated by the Level 2 hypervisor based on instructions received from the Level 3 VM.

17. The non-transitory computer readable storage medium of claim 13, wherein the second function component is generated by the Level 1 hypervisor based on instructions received from the Level 2 VM.

* * * * *